United States Patent
Yamada

(10) Patent No.: US 7,859,239 B2
(45) Date of Patent: Dec. 28, 2010

(54) SWITCHING REGULATOR AND METHOD OF ADJUSTING PULSE WIDTH

(75) Inventor: Shinichiro Yamada, Ikeda (JP)

(73) Assignee: Ricoh Company, Ltd., Tokyo (JP)

( * ) Notice: Subject to any disclaimer, the term of this patent is extended or adjusted under 35 U.S.C. 154(b) by 280 days.

(21) Appl. No.: 12/209,835

(22) Filed: Sep. 12, 2008

(65) Prior Publication Data

US 2009/0072805 A1 Mar. 19, 2009

(30) Foreign Application Priority Data

Sep. 13, 2007 (JP) .............................. 2007-238275

(51) Int. Cl.
*G05F 1/40* (2006.01)
*G05F 1/56* (2006.01)

(52) U.S. Cl. ........................ 323/283; 323/282; 323/288

(58) Field of Classification Search ......... 323/222–225, 323/268, 271, 282–285, 288
See application file for complete search history.

(56) References Cited

U.S. PATENT DOCUMENTS

RE37,609 E * 3/2002 Bittner ........................ 323/272

| | | | | |
|---|---|---|---|---|
| 7,061,215 B2 * | 6/2006 | Harris | ........................ | 323/268 |
| 2006/0132110 A1 * | 6/2006 | Tang | ........................... | 323/282 |
| 2009/0237053 A1 * | 9/2009 | Gan | ........................... | 323/283 |
| 2009/0243577 A1 * | 10/2009 | Lim | ........................... | 323/283 |

FOREIGN PATENT DOCUMENTS

| JP | 2006-262646 | 9/2006 |
|---|---|---|
| JP | 2006-333636 | 12/2006 |

* cited by examiner

*Primary Examiner*—Matthew V Nguyen
(74) *Attorney, Agent, or Firm*—Cooper & Dunham LLP

(57) ABSTRACT

A switching regulator switches according to an input signal and performs PWM control with a PWM pulse signal. The switching regulator includes a pulse width limiting circuit that includes a reference current source, a constant current source, a capacitor, an inverting block including a first switch circuit to supply a constant current to the capacitor and a second switch circuit to discharge a voltage across the capacitor to a ground, a determination circuit to determine whether the voltage across the capacitor becomes a given value or greater, and a limiting circuit to limit a pulse width of the PWM pulse signal. The inverting block further includes either a third switch circuit configured to pass the given constant current or a switching control circuit configured to cause the first and second switch circuits to pass the given constant current regardless of the PWM pulse signal.

9 Claims, 6 Drawing Sheets

SWITCHING REGULATOR AND METHOD OF ADJUSTING PULSE WIDTH

TECHNICAL FIELD

Example embodiments of this patent specification relate to a switching regulator and a method of adjusting a pulse width of a pulse formed in the switching regulator, and more particularly, to a PWM control switching regulator that reduces variations in pulse width of a PWM pulse signal at light load and variations in efficiency and output voltage ripple, and a method of adjusting a pulse width of a pulse formed in the above-described switching regulator.

BACKGROUND

Related-art switching regulators include a pulse width limiting function, such as that shown in FIG. 1.

FIG. 1 is a schematic diagram illustrating a related-art step-down switching regulator 100 including a pulse width limiting function.

The switching regulator 100, which is a pulse modulation control type switching regulator, includes an inductor L101, a capacitor C101, a reference voltage generator 102, an error amplifying circuit 103, a triangular wave generator 104, a PWM comparator 105, a pulse width limiting circuit 106, a control logic circuit 107, a reverse flow detector 108, an input terminal IN, an output terminal OUT, switches SW1 and SW2, and resistors R101 and R102.

The switching regulator 100 adjusts pulse widths so as to balance input power and output power, and according to the function, the pulse width decreases as a load current decreases. The smaller the pulse width becomes, the greater a ratio of loss power to input power, which results in significant deterioration in operating efficiency. Therefore, in order to keep the pulse width of a pulse for turning on a switching element SW1 from falling below a given threshold, the switching regulator 100 is provided with the pulse width limiting circuit 106 of FIG. 1.

In FIG. 1, by turning on the switching element SW1 with a wide, fixed pulse width when the load is light, a ripple voltage is increased, an oscillation frequency is decreased, and a loss of power in switching is reduced, thus improving efficiency.

However, too great a pulse width may boost the ripple voltage unnecessarily. By contrast, when the pulse width becomes too small, although the ripple voltage may decrease efficiency may be degraded. Therefore, it is necessary that the pulse width be kept within a range between a value great enough to prevent a decrease in efficiency and a value small enough to suppress an unnecessary increase in output voltage ripple.

FIG. 2 illustrates an example of the pulse width limiting circuit 106 of FIG. 1.

The pulse width limiting circuit 106 of FIG. 2 includes a pulse start circuit 112, a reference current source 113, a determination circuit 114, a constant current source 121, a comparator 122, switches SWa and SWb, and a capacitor Ca.

The constant current source 121 corresponds to a current mirror circuit that generates and outputs a constant current ia in proportion to a given reference current from the reference current source 113. When a PWM pulse signal Spw from the PWM comparator 104 rises to a high level, the pulse start circuit 112 causes the switch SWa to turn on to create a conduction state and causes the switch SWb to turn off to create a shutdown state, so as to charge a capacitor Ca with a constant current ia generated by the constant current source 121.

As a voltage at a non-inversion input terminal of the comparator 122 gradually increases, and when it reaches and exceeds a given reference voltage Vref, the comparator 122 outputs a high level signal to the determination circuit 114 and to the pulse start circuit 112, resets the pulse start circuit 112, and turns off the switch Swa to the shutdown state. At the same time, the comparator 122 also turns on the switch SWb to the conduction state so as to discharge the capacitor Ca.

The determination circuit 114 generates a pulse signal Spd from a signal input from the comparator 122 and a signal output from the pulse start circuit 112, and output the pulse signal Spd to the control logic circuit 107 of FIG. 1. The pulse signal Spd is generated by limiting the pulse width of the PWM pulse signal Spw.

Thus, the pulse width of the pulse signal Spd is determined by a current value of the constant current ia, the capacity of the capacitor Ca, and the reference voltage Vref.

A reference current and the reference voltage Vref are susceptible to process variations. Therefore, the pulse width of the pulse signal Spd has varied depending on the sample, producing samples that degraded efficiency or caused large output voltage ripples. To avoid these drawbacks and increase accuracy of the pulse width of the pulse signal Spd, tests were conducted to measure the reference current and the reference voltage Vref, in which the reference current and the reference voltage Vref were adjusted according to the measurements, and as a result, a desired pulse width was obtained.

However, since the constant current source 121 includes a current mirror circuit, the constant current source 121 has random process variations in a threshold voltage Vth, size, and mobility of the transistors that constitute the current mirror circuit. Consequently, since a current ratio of the constant current source 121 to the reference current source 113 varies, even when the reference current is adjusted accurately, the variations in the pulse width of the pulse signal Spd remain large.

SUMMARY

Example aspects of the present invention have been made in view of the above-described circumstances.

Example aspects of the present invention provide a switching regulator that can adjust a reference current according to a measurement of an output current so that variations of pulse widths of a pulse signal can be reduced to decrease variations in efficiency with a light load and variations in ripples of an output voltage.

Other example aspects of the present invention provide a method of adjusting a pulse width that can be performed in the above-described switching regulator.

In one example embodiment, a switching regulator switches according to an input signal and performs a PWM control with a PWM pulse signal generated to cause an output voltage from an output terminal to be a given constant voltage with respect to a switching element for charging an inductor with an input voltage to an input terminal. The switching regulator includes a control logic circuit configured to receive the PWM pulse signal and a pulse width limiting circuit configured to limit a duty cycle of the PWM pulse signal so that a period of time the switching element remains ON is a given minimum value or greater. The pulse width limiting circuit includes a reference current source configured to generate and output a reference current, a constant current source configured to generate and output a given constant current based on the reference current, a capacitor configured to be charged with the constant current, an inverting block configured to connect the constant current source and a ground and to receive the given constant current from the constant current source, the inverting block including a first switch circuit configured to supply the constant current to the capacitor according to a level of the PWM pulse signal and a second switch circuit configured to discharge a voltage across the capacitor to the ground when the first switch circuit stops supplying the constant current to the capacitor, a determination circuit configured to determine whether the voltage across the capacitor becomes a given value or greater, and a limiting circuit configured to hold the level of the PWM pulse signal during a period of time from when the PWM pulse signal reaches the level to turn on the switching element to when the voltage across the capacitor reaches and exceeds the given value, and to limit a pulse width of the PWM pulse signal.

The inverting block may further include a third switch circuit configured to pass the given constant current from the constant current source to the ground at a given voltage according to a test signal from an external circuit during a test.

The third switching circuit may connect a current output terminal of the first switch circuit to the ground, according to a test signal input from an external unit.

The level of the PWM pulse signal may be fixed to a given signal level so as to cause the first switch circuit to supply the constant current to the capacitor during the test.

The third switch circuit may connect a current output terminal of the constant current source to the ground.

The level of the PWM pulse signal may be fixed to a given signal level so as to cause the first switch circuit to stop supplying the constant current to the capacitor during the test.

The inverting block may further include a switching control circuit configured to control operation of the first switch circuit and the second switch circuit to pass the given constant current from the constant current source to the ground at the given voltage regardless of the PWM pulse signal according to a test signal from an external circuit during a test.

A method of adjusting a pulse width limit for the above-described switching regulator including a current mirror circuit in which the constant current source receives the reference current as an input current and generates and outputs the given constant current in proportion to the reference current. The method of adjusting a pulse width limit performed during the test may include shutting down a connection between the third switch circuit and the constant current source to interrupt a flow of the given constant current generated and output by the constant current source to the ground, measuring a first power supply current flowing in the constant current source, connecting the third switch circuit and the constant current source to resume the flow of the given constant current to the ground, measuring a second power supply current flowing in the constant current source, and adjusting a current value of the reference current to cause a difference between the first power supply current and the second power supply current to become a desired measured value.

A method of adjusting a pulse width limit for the above-described switching regulator including a current mirror circuit in which the constant current source receives the reference current as an input current and generates and outputs the given constant current in proportion to the reference current. The method of adjusting a pulse width limit performed during the test may include shutting down a connection between the first switch circuit and the second switch circuit and the constant current source to interrupt a flow of the given constant current generated and output by the constant current source to the ground, measuring a first power supply current flowing in the constant current source, causing the first switch circuit and the second switch circuit to pass the given constant current to the ground, measuring a second power supply current flowing in the constant current source, and adjusting a current value of the reference current to cause a difference between the first power supply current and the second power supply current to become a desired measured value.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF EXAMPLE EMBODIMENTS

Figure 1:
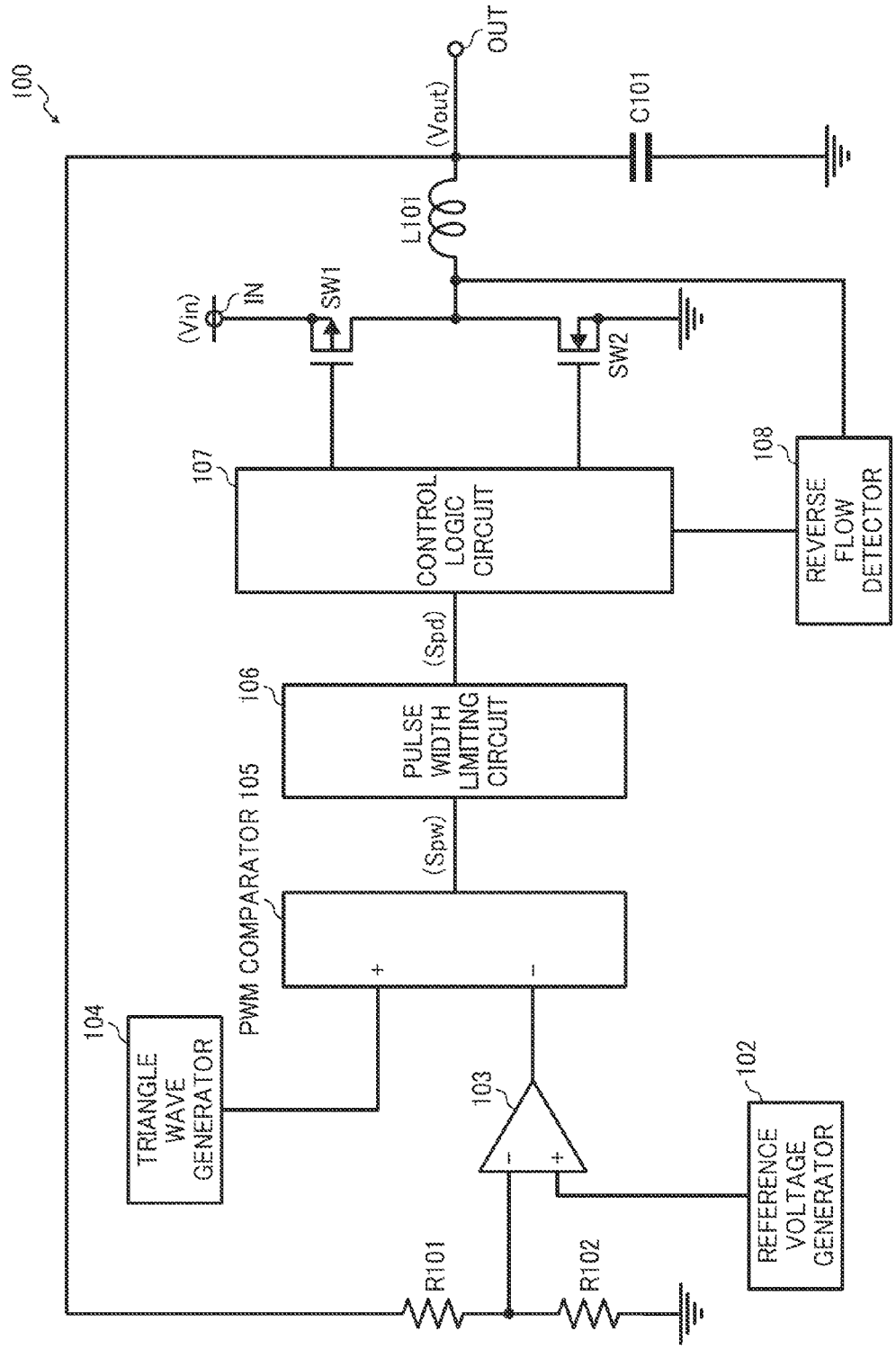
FIG. 1 is a schematic configuration of a related-art step-down switching regulator.
Figure 2:
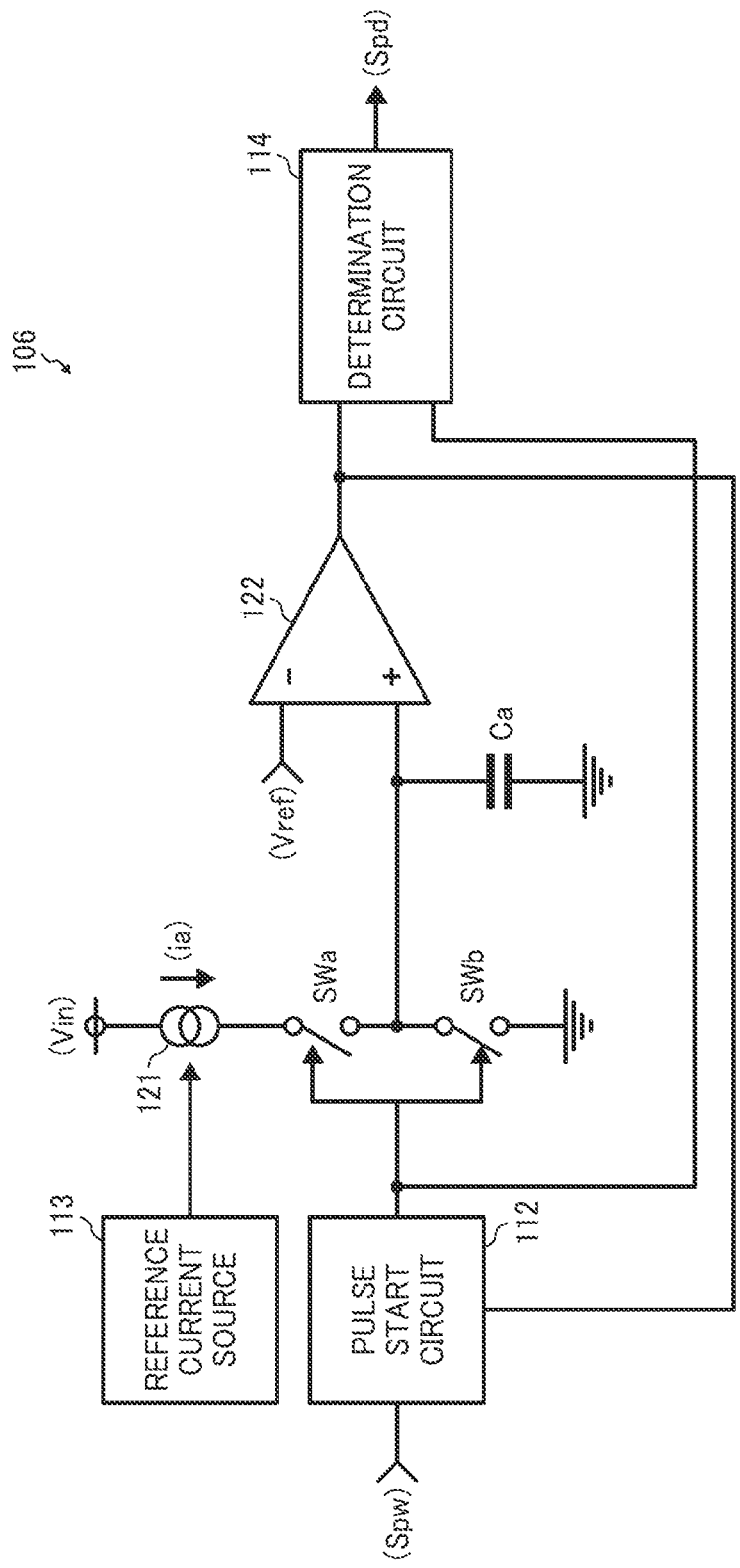
FIG. 2 is a schematic diagram of a pulse width limiting circuit included in the related-art switching regulator or FIG. 1.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referring now to the drawings, wherein like reference numerals designate identical or corresponding parts throughout the several views, preferred embodiments of the present patent specification are described.

First Exemplary Embodiment

Figure 3:
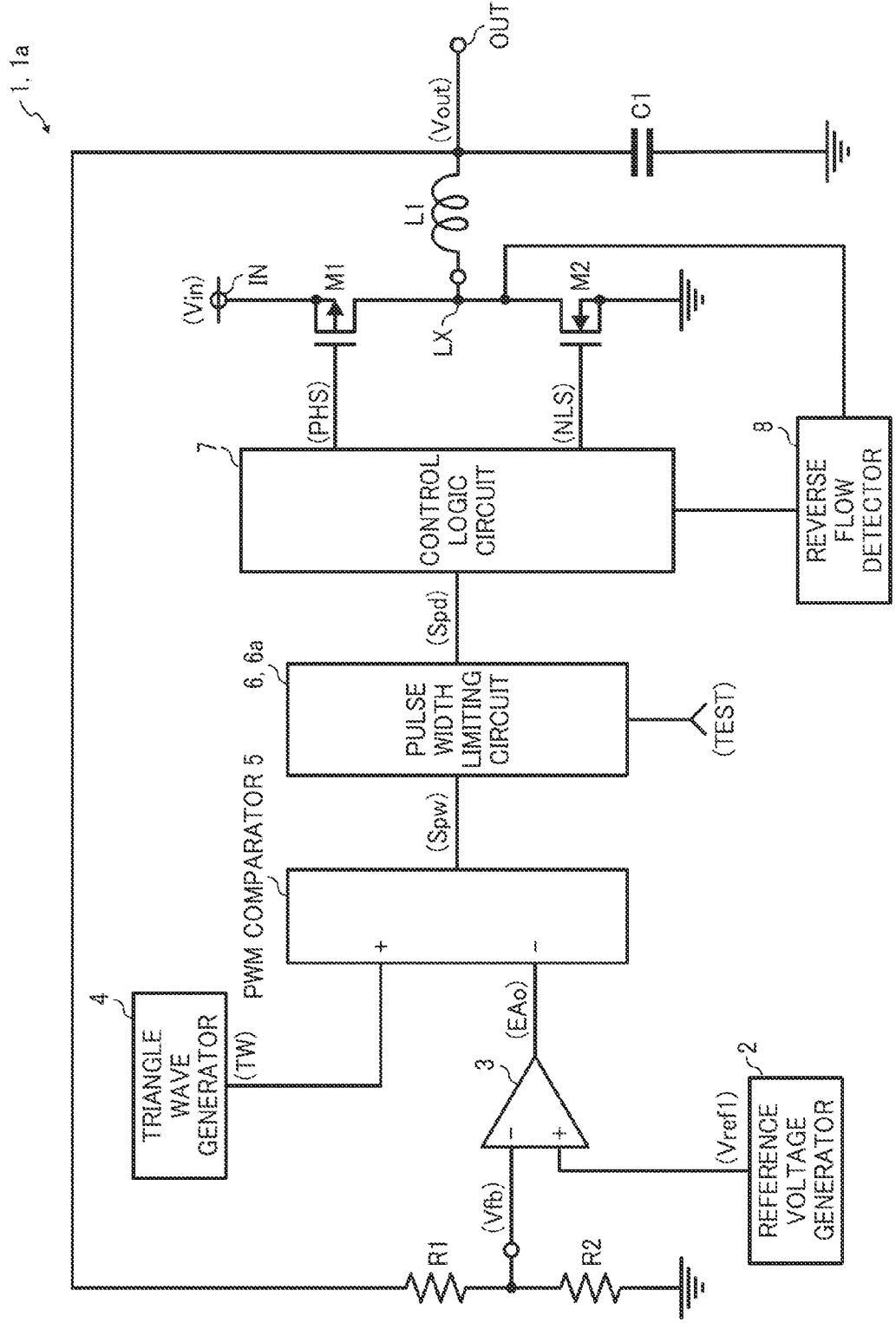
FIG. 3 is a schematic configuration of a switching regulator according to at least one exemplary embodiment of this patent application.

FIG. 3 illustrates a schematic configuration of a switching regulator 1 according to a first exemplary embodiment of the present patent specification.

The switching regulator 1 of FIG. 3 may correspond to a synchronous rectifying type switching regulator that includes an input terminal IN and an output terminal OUT. The switching regulator 1 converts an input voltage Vin that is input to the input terminal IN into a given constant voltage and outputs the given constant voltage as an output voltage Vout from the output terminal OUT.

The switching regulator 1 further includes a switching transistor M1, a synchronous rectification type transistor M2, a reference voltage generator 2, resistors R1 and R2, an inductor L1, a smoothing capacitor C1, an error amplifying circuit 3, a triangular wave generator 4, a pulse width modulation or PWM comparator 5, a pulse width limiting circuit 6, a control logic circuit 7, and a reverse flow detector 8.

The switching transistor M1 includes a PMOS transistor that performs switching operations for an output control of the input voltage Vin.

The synchronous rectification type transistor M2 includes a NMOS transistor.

The circuits or units except the inductor L1 and the capacitor C1 in the switching regulator 1 can be integrated into one integrated circuit or IC. Alternatively, the circuits or units except the switching transistor M1 and/or the synchronous rectification type transistor M2, the inductor L1, and the capacitor C1 in the switching regulator 1 can be integrated into one IC.

The synchronous rectification type transistor M2 is connected in series between the input terminal IN and a ground having a ground voltage.

A connecting point LX is provided between the switching transistor M1 and the synchronous rectification type transistor M2. The inductor L1 is connected between the connecting point LX and the output terminal OUT.

The resistors R1 and R2 are connected in series between the output terminal OUT and the ground having the ground voltage. The capacitor C1 is connected in series between the output terminal OUT and the ground having the ground voltage as well. The output voltage Vout is divided into a divided voltage Vfb, which is output from a connecting point between the resistors R1 and R2.

The reference voltage generator 2 generates and outputs a first reference voltage Vref1.

In the error amplifying circuit 3, the divided voltage Vfb is input to an inversion input terminal, and the first reference voltage Vref1 is input to a non-inversion input terminal, respectively. The error amplifying circuit 3 amplifies a voltage difference between the divided voltage Vfb and the first reference voltage Vref1 to generate an output signal EAo, and outputs the output signal EAo to an inversion input terminal of the PWM comparator 5.

The triangular wave generator 4 generates a given triangular wave signal TW to output the triangular wave signal TW to a non-inversion input terminal of the PWM comparator 5.

The PWM comparator 5 performs a pulse width modulation on the output signal EAo that is input from the error amplifying circuit 3 by using the triangular wave signal TW, then generates a PWM pulse signal Spw for a PWM control, and outputs the PWM pulse signal Spw to the pulse width limiting circuit 6.

The pulse width limiting circuit 6 limits the PWM pulse signal Spw and outputs the PWM pulse signal Spw as a pulse signal Spd to the control logic circuit 7.

The control logic circuit 7 generates a control signal PHS according to the pulse signal Spd that is input from the pulse width limiting circuit 6, and outputs the control signal PHS to a gate of the switching transistor M1. At the same time, the control logic circuit 7 also generates a control signal NLS according to the pulse signal Spd that is input from the pulse width limiting circuit 6, and outputs the control signal NLS to a gate of the synchronous rectification type transistor M2.

The reverse flow detector 8 detects a symptom or indication that a reverse flow of current occurs from a drain of the synchronous rectification type transistor M2 to a source thereof. When detecting an occurrence of the reverse flow, the reverse flow detector 8 outputs a given signal to the control logic circuit 7. The control logic circuit 7 causes the synchronous rectification type transistor M2 to turn off to create a shutdown state, regardless of the pulse signal Spd, so as to prevent the occurrence of the reverse flow.

In the above-described configuration, when a voltage of the connecting point LX is less than the ground voltage and an occurrence of the reverse flow of current flowing from the connecting point LX to the ground is not indicated, the reverse flow detector 8 outputs a signal indicating that an occurrence of the reverse flow of current does not occur, to the control logic circuit 7.

Under the above-described condition, when the output voltage Vout of the switching regulator 1 becomes great, an voltage of the output signal EAo of the error amplifying circuit 3 decreases and a duty cycle of the PWM pulse signal Spw input from the PWM comparator 5 also decreases. As a result, a period of time that the switching transistor M1 is ON may be shorter, and in response, a period of time that the synchronous rectification type transistor M2 is ON may be longer. Thus, the switching regulator 1 can be controlled so that the output voltage Vout can decrease.

By contrast, when the output voltage Vout of the switching regulator 1 becomes small, the voltage of the output signal EAo of the error amplifying circuit 3 increases and the duty cycle of the PWM pulse signal Spw input from the PWM comparator 5 also increases. As a result, the period of time that the switching transistor M1 is ON may be longer, and in response the period of time that the synchronous rectification type transistor M2 is ON may be shorter. Thus, the switching regulator 1 can be controlled so that the output voltage Vout can increase.

Accordingly, by repeating the above-described operations, the output voltage Vout of the switching regulator 1 can be controlled to remain constant at a given voltage.

Next, a description is given of operations performed by the pulse width limiting circuit 6.

To cause the switching transistor M1 to remain ON for a period of time longer than a given minimum period, the pulse width limiting circuit 6 limits the duty cycle of the PWM pulse signal and outputs the PWM pulse signal to the control logic circuit 7.

Figure 4:
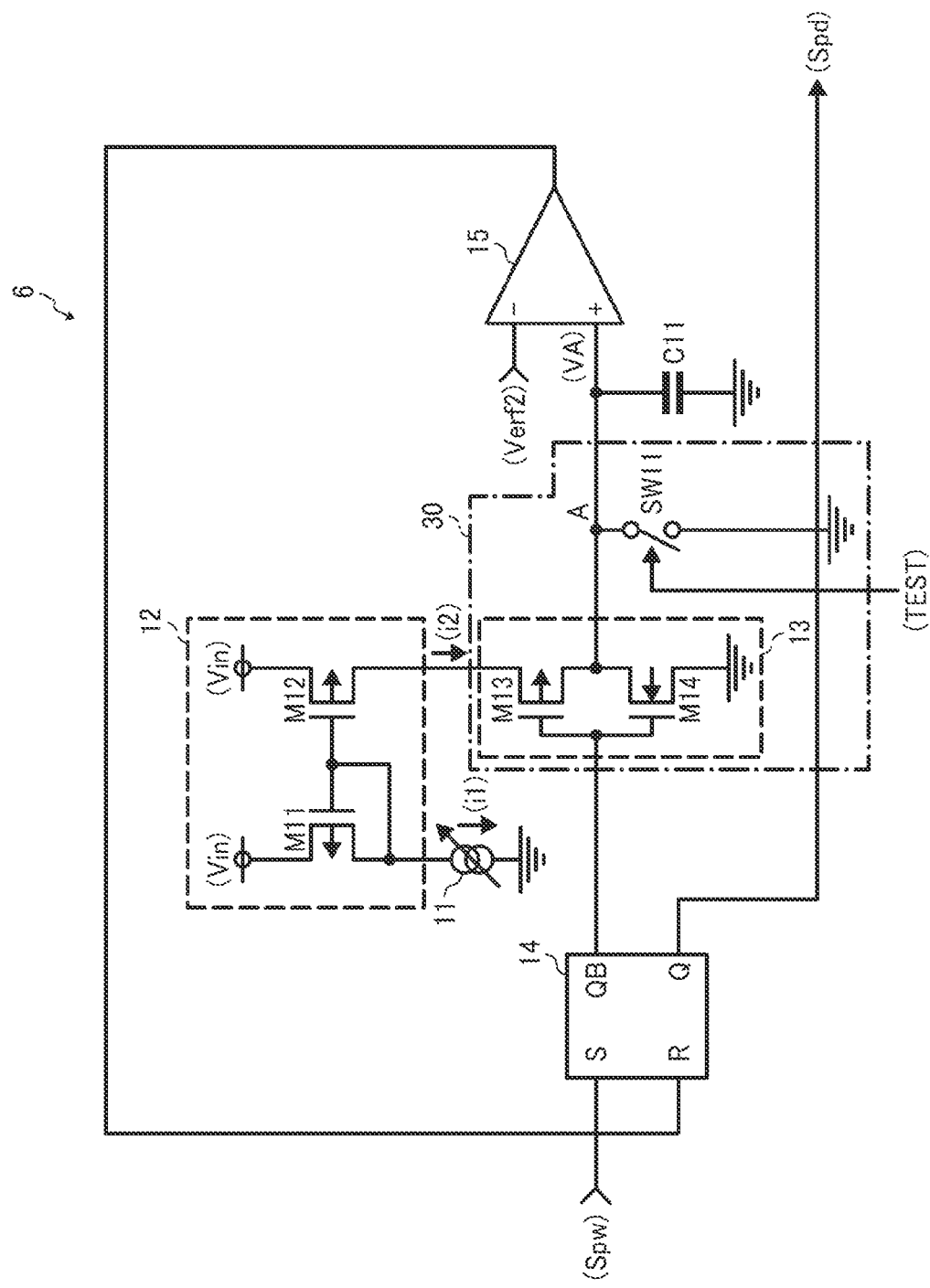
FIG. 4 is a schematic diagram of a pulse width limiting circuit included in the switching regulator of FIG. 3, according to a first exemplary embodiment of this patent specification.

FIG. 4 illustrates a schematic diagram of the pulse width limiting circuit 6.

The pulse width limiting circuit 6 of FIG. 4 includes a reference current source 11, a constant current source 12, an inverter unit 13, an RS latch circuit 14, a comparator 15, a capacitor C11, and a switch SW11.

The reference current source 11 generates and output a given reference current i1.

The constant current source 12 corresponds to a current mirror circuit that is composed of PMOS transistors M11 and M12. The constant current source 12 generates a given constant current i2 based on the reference current i1, and outputs the given constant current i2 to the inverter unit 13.

The inverter unit 13 composed of a PMOS transistor M13 and a NMOS transistor M14. The PMOS transistor M13 serves as a first switch circuit, and the NMOS transistor M14 serves as a second switch circuit.

The RS latch circuit 14 serves as a limiting circuit.

The comparator 15 serves as a determination circuit.

The switch SW11 serves as a third switch circuit and is used in tests for switching according to a test signal TEST that is input from an external circuit.

The inverter unit 13, which includes the PMOS transistor M13 and the NMOS transistor M14, and the switch SW11 form an inverting block 30.

In the constant current source 12, respective sources of the PMOS transistors M11 and M12 are connected to respective input voltages Vin, and respective gates thereof meet at a connecting point to be connected to a drain of the PMOS transistor M11.

The reference current source 11 is connected between the drain of the PMOS transistor M11 that corresponds to one input terminal of the constant current source 12 and the ground.

The PMOS transistor M13 and the NMOS transistor M14 are connected in series between a drain of the PMOS transistor M12 that corresponds to the other input terminal of the constant current source 12 and the ground.

A connecting point of the PMOS transistor M13 and the NMOS transistor M14 corresponds to an output terminal of the inverter unit 13, and the output terminal is connected to a non-inversion input terminal of the comparator 15. In addition, a gate of the PMOS transistor M13 and a gate of the NMOS transistor M14 are connected at a connecting point, which corresponds to an input terminal of the inverter unit 13. The input terminal is connected to an inversion output terminal QB of the RS latch circuit 14.

A second reference voltage Vref2 is input to an inversion input terminal of the comparator 15. An output terminal of the comparator 15 is connected to a reset input terminal R of the RS latch circuit 14.

When a connecting point A is provided between the output terminal of the inverter unit 13 and the non-inversion input terminal of the comparator 15, the switch SW11 and the capacitor C11 are connected in parallel between the connecting point A and the ground.

A set input terminal S of the RS latch circuit 14 corresponds to an input terminal of the pulse width limiting circuit 6, and receives the PWM pulse signal Spw.

A non-inversion output terminal Q of the RS latch circuit 14 corresponds to an output terminal of the pulse width limiting circuit 6, and outputs the pulse signal Spd.

When the PWM pulse signal Spw shifts to a high level, the RS latch circuit 14 causes the non-inversion output terminal Q to be held at a high level and the inversion output terminal QB at a low level. With the above-described operations, the high-level pulse signal Spd is output and the switching transistor M1 turns on to create a conduction state.

When the inversion output terminal QB is shifted to the low level, the PMOS transistor M13 turns on to create a conduction state and, at the same time, the NMOS transistor M14 turns off to create a shutdown state. In this state, the capacitor C11 is charged with the constant current i2 input from the constant current source 12. With the above-described operations, a voltage VA at the connecting point A gradually increases. Accordingly, when the voltage VA becomes equal to or greater than the second reference voltage Vref2, the output terminal of the comparator 15 shifts to a high level to reset the RS latch circuit 14.

At this time, when the PWM pulse signal Spw is held at the high level, the non-inversion output terminal Q of the RS latch circuit 14 remains at the high level and the reset input terminal R thereof also remains at the high level. As a result, the signal level of the non-inversion output terminal Q changes in synchronization with the PWM pulse signal Spw. That is, immediately after the PWM pulse signal Spw shifts to a low level, the signal level of the non-inversion output terminal Q may change to a low level.

Further, the PWM pulse signal Spw may shift to a high level, and then shift to a low level before the voltage VA at the connecting point A reaches or exceeds the second reference voltage Vref2. In such case, since a low-level signal is input to the reset input terminal R of the RS latch circuit 14, the inversion output terminal QB of the RS latch circuit 14 may shift to a high level, and the comparator 15 holds the output terminal to a low level. Then, the output terminal of the comparator 15 rises from the low level to the high level, and the RS latch circuit 14 is reset.

At this time, the pulse width of the pulse signal Spd that is output from the RS latch circuit 14 may be longer than the pulse width of the PWM pulse signal Spw, and the pulse width limiting circuit 6 limits the minimum pulse width of the PWM pulse signal Spw and outputs the limited pulse width of the PWM pulse signal Spw.

If the pulse width of the pulse signal Spd is too long, voltage ripple may increase when the load is light. By contrast, if the pulse width of the pulse signal Spd is too short, the operating efficiency may deteriorate. Therefore, the constant current i2 is measured during a test by changing the switch SW11 ON and OFF while a voltage is input to the inversion input terminal of the error amplifying circuit 3 so that the PWM pulse signal Spw can become a high level to output a low level signal from the inversion output terminal QB of the RS latch circuit 14.

For example, the resistors R1 and R2 are provided outside the IC, and the divided voltage Vfb is input to the inversion input terminal of the error amplifying circuit 3 via a terminal of the IC. Therefore, a desired voltage can be input to the inversion input terminal of the error amplifying circuit 3 via the IC terminal under the condition that the resistors R1 and R2 are not connected to the IC.

Specifically, the following measurement may be performed while the low level signal is output from the inversion output terminal QB of the RS latch circuit 14.

A test signal TEST is transmitted to cause the switch SW11 to turn off to create the shutdown state. At this time, a power supply current that flows in the constant current source 12 is measured to obtain a current value of the reference current i1.

Then, the test signal TEST causes to turn on the switch SW11 to create the conduction state. At this time, the power supply current flowing in the constant current source 12 is measured to obtain another current value that is a sum of the reference current i1 and the constant current i2.

A measurement value of the constant current i2 can be obtained by subtracting the current value measured when the switch SW11 turns off to create a shutdown state from the current value measured when the switch SW11 becomes ON. To obtain a desired measurement value of the constant current i2, the current value of the reference current i1 may be adjusted by trimming, etc.

In the pulse width limiting circuit 6 of FIG. 4, the switch SW11 is connected between the connecting point A and the ground. With this configuration, when a capacitance of the capacitor C11 is reduced to unable to disregard a gate amount of a MOS transistor so as to reduce an IC area, it is possible that the switch SW11 may have an unintended load capacity on connecting the switch SW11 to the connecting point A.

Figure 5:
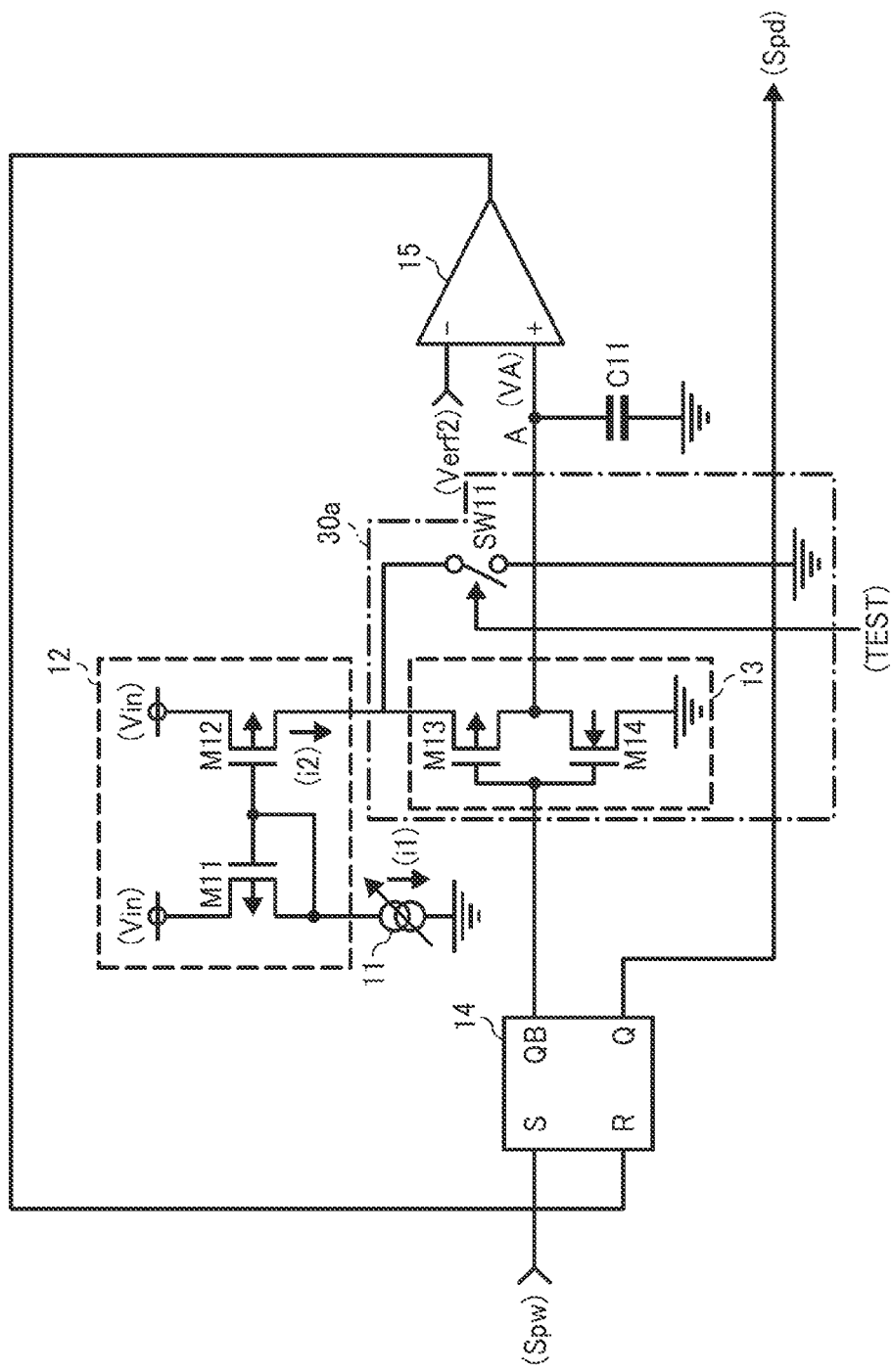
FIG. 5 is another schematic diagram of the pulse width limiting circuit of FIG. 4, according to the first exemplary embodiment of this patent specification.

FIG. 5 illustrates another schematic diagram of the pulse width limiting circuit 6. In the configuration of the pulse width limiting circuit 6 of FIG. 5, the switch SW11 is connected between the drain of the PMOS transistor M12 that corresponds to an output terminal of the constant current source 12 and the ground. The pulse width limiting circuit 6 of FIG. 5 includes an inverting block 30a formed by the inverter unit 13, which includes the PMOS transistor M13 and the NMOS transistor M14, and the switch SW11 disposed between the ground and the drain of the PMOS transistor M12.

In this case, the PMOS transistor M13 turns off to create a shutdown state to input a voltage to the inversion input terminal of the error amplifying circuit 3 so that the PWM pulse signal Spw can shift to the low level in the test. Other operations in the test are omitted since these operations are same as the operations performed in the configuration of the pulse width limiting circuit 6 of FIG. 4.

As described above, the switching regulator 1 according to the first exemplary embodiment of the present patent specification includes the pulse width limiting circuit 6 in which the switch SW11 is disposed either between the output terminal of the inverter unit 13 and the ground or between the output terminal of the constant current source 12 and the ground. The switch SW11 performs switching according to the test signal TEST that is input from the external circuit. By measuring the power supply current that flows in the constant current source 12 when the switch SW11 turns off to create a shutdown state during the test and the power supply current that flows in the constant current source 12 when the switch SW11 becomes ON during the test, the constant current i2 can be obtained accurately, and therefore the constant current i2 can be set to a desired value correctly. Accordingly, variations in pulse width of the pulse signal Spd can be decreased, and thereby reducing variations in efficiency caused when the load is light and variations in the output voltage ripple.

Second Exemplary Embodiment

Figure 6:
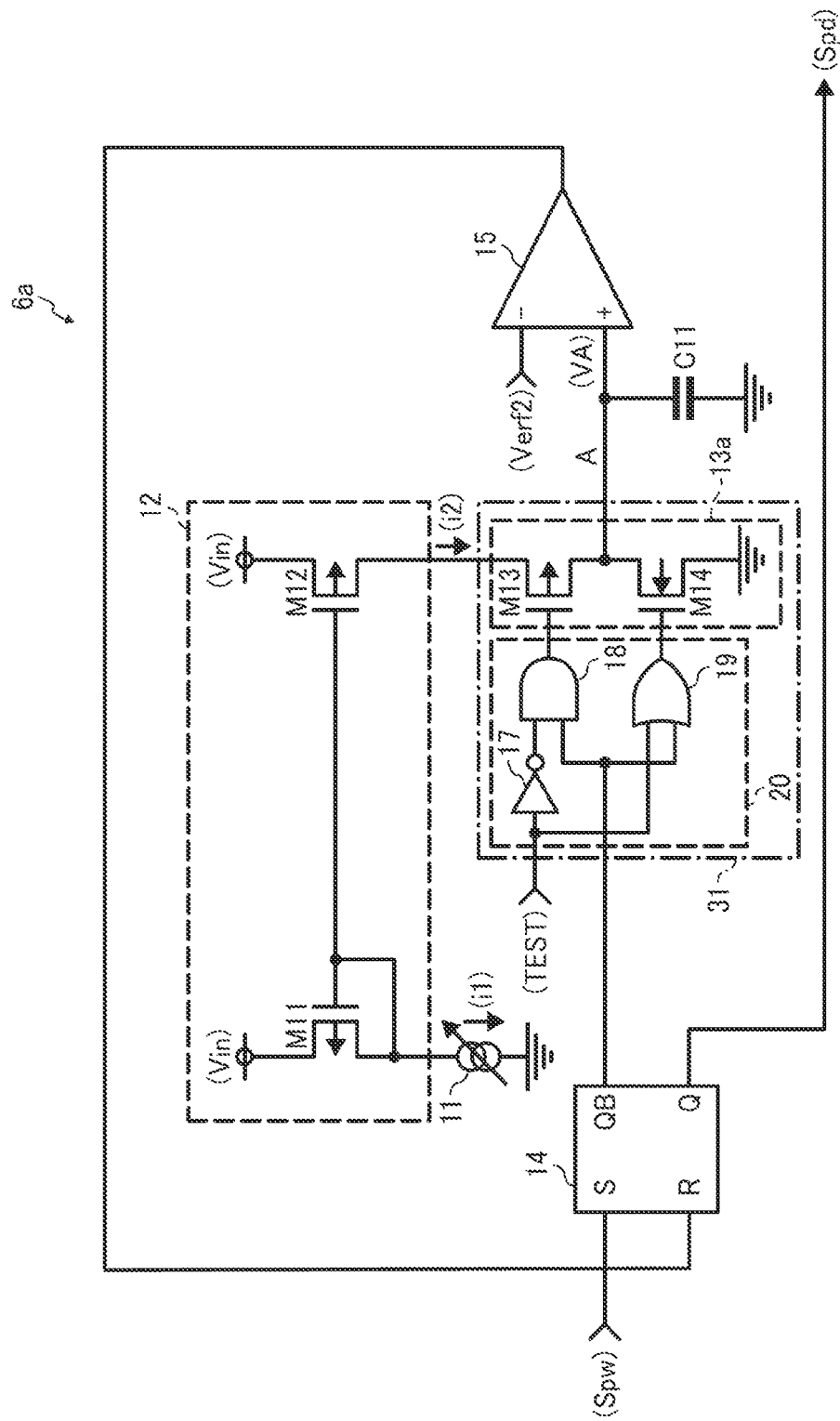
FIG. 6 is a schematic diagram of another pulse width limiting circuit of the switching regulator of FIG. 3, according to a second exemplary embodiment of the present patent specification.

FIG. 6 illustrates a schematic diagram of a pulse width limiting circuit 6a (see FIG. 3) of a switching regulator 1a (see FIG. 3) according to a second exemplary embodiment of the present patent specification.

The switching regulator 1a according to the second exemplary embodiment includes the pulse width limiting circuit 6a in which the NMOS transistor M14 included in an inverting block 31 is employed to replace the switch SW11 of the pulse width limiting circuit 6 of the switching regulator 1 according to the first exemplary embodiment.

Elements or components of the pulse width limiting circuit 6a of the switching regulator 1a of FIG. 6 may be denoted by the same reference numerals as those of the pulse width limiting circuit 6 of the switching regulator 1 of FIG. 3 according to the first exemplary embodiment and the descriptions thereof are omitted or summarized.

When the switch SW11 is provided between the ground and the connecting point of the constant current source 12 and the inverter unit 13 as shown in the pulse width limiting circuit 6 in FIG. 4, a start up time of the inverter unit 13 may change, which may lead to variations in the pulse width of the pulse signal Spd.

Therefore, the inverting block 30 including the switch SW11 of the pulse width limiting circuit 6 of FIG. 4 may be replaced by the modified inverting block 31 of the pulse width limiting circuit 6a of FIG. 6.

The pulse width limiting circuit 6a includes the reference current source 11, the constant current source 12, the inverting block 31 that receives the constant current i2 from the constant current source 12, the RS latch circuit 14, the comparator 15, and the capacitor C11.

The inverting block 31 includes the PMOS transistor M13, the NMOS transistor M14, an inverter 17, an AND circuit 18, and an OR circuit 19. The PMOS transistor M13 and the NMOS transistor M14 serve as an inverter unit 13a. In addition, the inverter 17, the AND circuit 18, and the OR circuit 19 serve as a switching control circuit 20.

One input terminal of the AND circuit 18 of the switching control circuit 20 and one input terminal of the OR circuit 19 of the switching control circuit 20 are connected at a connecting point which is connected to the inversion output terminal QB of the RS latch circuit 14.

The test signal TEST is input from the external circuit to the other input terminal of the AND circuit 18 via the inverter 17 of the switching control circuit 20 and to the other input terminal of the OR circuit 19.

An output terminal of the AND circuit 18 is connected to the gate of the PMOS transistor M13. An output terminal of the OR circuit 19 is connected to the gate of the NMOS transistor M14.

With the above-described configuration, the test signal TEST is at a low level during normal operations, and therefore the signal that is output from the inversion output terminal QB of the RS latch circuit 14 is input to the gate of the PMOS transistor M13 via the AND circuit 18 and, at the same time, to the gate of the NMOS transistor M14 via the OR circuit 19. Accordingly, the operations of the pulse width limiting circuit 6a during the normal operations are same as those of the pulse width limiting circuit 6 of FIG. 4.

Next, the constant current i2 is measured during a test by changing the signal level of the test signal TEST while a voltage is input to the inversion input terminal of the error amplifying circuit 3 so that the PWM pulse Spw can become a low level to output a high level signal from the inversion output terminal QB of the RS latch circuit 14.

Specifically, the following measurement may be performed while the high level signal is output from the inversion output terminal QB of the RS latch circuit 14.

The high level signal is input to the one input terminal of the OR circuit 19. Therefore, regardless of the test signal TEST, the output terminal of the OR circuit 19 rises to a high level, and the NMOS transistor M14 turns on to create a conduction state. By contrast, the AND circuit 18 outputs a low level signal when the test signal TEST rises to a high level, and outputs a high level signal when the test signal TEST changes to a low level.

The test signal TEST is transmitted to turn off the PMOS transistor M13 to create the shutdown state. At this time, a power supply current that flows in the constant current source 12 is measured to obtain a current value of the reference current i1.

Then, the test signal TEST causes to turn on the PMOS transistor M13 to create the conduction state. At this time, the power supply current flowing in the constant current source 12 is measured to obtain another current value that is a sum of the reference current i1 and the constant current i2.

A measurement value of the constant current i2 can be obtained by subtracting the current value measured when the PMOS transistor M13 turns off to create a shutdown state from the current value measured when the PMOS transistor M13 turns on. To obtain a desired measurement value of the constant current i2, the current value of the reference current i1 may be adjusted by trimming, etc.

As described above, the switching regulator 1a according to the second exemplary embodiment of the present patent specification can achieve the same effect as the switching regulator 1 according to the first exemplary embodiment and, at the same time, can maintain the accuracy of the pulse width by replacing the switch SW11 of the inverting block 30 or 30a to the switching control circuit 20 of the inverting block 31 so as to maintain a constant start up time of the inverter unit 13a. Further, in spite of an increase in the number of gates, the capacitance components of the connecting point of the constant current source 12 and the inverter unit 13a can be reduced. Therefore, a period of time required from a turn-on of the PMOS transistor M13 to stabilization of the constant current i2 can be reduced.

As described above, a step-down switching regulator of synchronous rectification type has been used in the first and second exemplary embodiments. However, this patent specification is not limited to such step-down switching regulator, but can be applied to a step-down switching regulator of asynchronous rectification type, a step-up switching regulator, and so forth.

When a step-down switching regulator of asynchronous rectification type is employed, the reverse flow detector 8 is not necessary. In this case, the synchronous rectification type transistor M2 of FIG. 3 can be replaced with a diode where an anode thereof may be connected to ground and a cathode thereof may be connected to the connecting point LX.

Further, when a step-up switching regulator of synchronous rectification type is employed, the inductor L1 and the switching transistor M1 that includes an NMOS transistor in this case can be connected in series between the input terminal IN that inputs the input voltage Vin and the ground, and the synchronous rectification type transistor M2 that includes a PMOS transistor in this case can be connected between the output terminal OUT and the connecting point LX of the inductor L1 and the switching transistor M1. The control signal NLS can be input to the gate of the switching transistor M1, and the control signal PHS can be input to the gate of the synchronous rectification type transistor M2.

Further, when a step-up switching regulator of asynchronous rectification type is employed, the synchronous rectification type transistor M2 can be replaced with a diode where an anode thereof may be connected to the connecting point LX and a cathode thereof may be connected to the output terminal OUT.

The above-described example embodiments are illustrative, and numerous additional modifications and variations are possible in light of the above teachings. For example, elements and/or features of different illustrative and example embodiments herein may be combined with each other and/or substituted for each other within the scope of this disclosure and appended claims. It is therefore to be understood that within the scope of the appended claims, the disclosure of this patent specification may be practiced otherwise than as specifically described herein.

Obviously, numerous modifications and variations of the present invention are possible in light of the above teachings. It is therefore to be understood that within the scope of the appended claims, the invention may be practiced otherwise than as specifically described herein.

This application claims priority from Japanese patent application No. 2007-238275 filed on Sep. 13, 2007 in the Japan Patent Office, the entire contents of which is hereby incorporated by reference herein.

What is claimed is:

1. A switching regulator configured to switch according to an input signal and perform PWM control with a PWM pulse signal generated to cause an output voltage from an output terminal to be a given constant voltage with respect to a switching element for charging an inductor with an input voltage to an input terminal, the switching regulator comprising:

a control logic circuit configured to receive the PWM pulse signal; and a pulse width limiting circuit configured to limit a duty cycle of the PWM pulse signal so that a period of time the switching element remains ON is a given minimum value or greater, wherein the pulse width limiting circuit includes:

a reference current source configured to generate and output a reference current;

a constant current source configured to generate and output a given constant current based on the reference current;

a capacitor configured to be charged with the constant current;

an inverting block configured to connect the constant current source and a ground and to receive the given constant current from the constant current source, the inverting block comprising:

a first switch circuit configured to supply the constant current to the capacitor according to a level of the PWM pulse signal; and a second switch circuit configured to discharge a voltage across the capacitor to the ground when the first switch circuit stops supplying the constant current to the capacitor;

a determination circuit configured to determine whether the voltage across the capacitor becomes a given value or greater; and a limiting circuit configured to hold the level of the PWM pulse signal during a period of time from when the PWM pulse signal reaches the level to turn on the switching element to when the voltage across the capacitor reaches and exceeds the given value, and to limit a pulse width of the PWM pulse signal.

2. The switching regulator according to claim 1, wherein the inverting block further comprises a third switch circuit configured to pass the given constant current from the constant current source to the ground at a given voltage according to a test signal from an external circuit during a test.

3. The switching regulator according to claim 2, wherein the third switching circuit connects a current output terminal of the first switch circuit to the ground according to a test signal input from an external unit.

4. The switching regulator according to claim 3, wherein the level of the PWM pulse signal is fixed to a given signal level so as to cause the first switch circuit to supply the constant current to the capacitor during the test.

5. The switching regulator according to claim 2, wherein the third switch circuit connects a current output terminal of the constant current source to the ground.

6. The switching regulator according to claim 4, wherein the level of the PWM pulse signal is fixed to a given signal level so as to cause the first switch circuit to stop supplying the constant current to the capacitor during the test.

7. The switching regulator according to claim 1, wherein the inverting block further comprises a switching control circuit configured to control operation of the first switch circuit and the second switch circuit to pass the given constant current from the constant current source to the ground at the given voltage regardless of the PWM pulse signal according to a test signal from an external circuit during a test.

8. A method of adjusting a pulse width limit for the switching regulator according to claim 2, the switching regulator including a current mirror circuit in which the constant current source receives the reference current as an input current and generates and outputs the given constant current in proportion to the reference current, the method of adjusting a pulse width limit performed during the test and comprising:

shutting down a connection between the third switch circuit and the constant current source to interrupt a flow of the given constant current generated and output by the constant current source to the ground;

measuring a first power supply current flowing in the constant current source;

connecting the third switch circuit and the constant current source to resume the flow of the given constant current to the ground;

measuring a second power supply current flowing in the constant current source; and adjusting a current value of the reference current to cause a difference between the first power supply current and the second power supply current to become a desired measured value.

9. A method of adjusting a pulse width limit for the switching regulator according to claim 7, the switching regulator including a current mirror circuit in which the constant current source receives the reference current as an input current and generates and outputs the given constant current in proportion to the reference current, the method of adjusting a pulse width limit performed during the test and comprising:

shutting down a connection between the first switch circuit and the second switch circuit and the constant current source to interrupt a flow of the given constant current generated and output by the constant current source to the ground;

measuring a first power supply current flowing in the constant current source;

causing the first switch circuit and the second switch circuit to pass the given constant current to the ground;

measuring a second power supply current flowing in the constant current source; and adjusting a current value of the reference current to cause a difference between the first power supply current and the second power supply current to become a desired measured value.

* * * * *